(12) United States Patent
Duncan et al.

(10) Patent No.: US 11,524,613 B2
(45) Date of Patent: Dec. 13, 2022

(54) VENTILATED SEAT WITH LOW PRESSURE ZONE INDUCED AIRFLOW

(71) Applicant: Lear Corporation, Southfield, MI (US)

(72) Inventors: Bradley C. Duncan, Harrison Township, MI (US); Vyachislav Ivanov, West Bloomfield, MI (US); Caleb Abbey, Warren, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 17/134,705

(22) Filed: Dec. 28, 2020

(65) Prior Publication Data

US 2022/0203875 A1 Jun. 30, 2022

(51) Int. Cl.
*B60N 2/56* (2006.01)
*B60N 2/64* (2006.01)

(52) U.S. Cl.
CPC ............ *B60N 2/5642* (2013.01); *B60N 2/64* (2013.01)

(58) Field of Classification Search
CPC ..... B60N 2/665; B60N 2/5642; B60N 2/5664
See application file for complete search history.

(56) References Cited

U.S. PATENT DOCUMENTS

| | | | |
|---|---|---|---|
| 4,555,140 A * | 11/1985 | Nemoto | B60N 2/914 297/DIG. 8 |
| 8,491,057 B2 | 7/2013 | Demontis et al. | |
| 8,801,104 B2 | 8/2014 | Di Giusto et al. | |
| 9,333,889 B1 * | 5/2016 | Cloutier | B60N 2/5642 |
| 9,642,469 B2 | 5/2017 | Savicki et al. | |
| 10,363,852 B2 | 7/2019 | Strumolo et al. | |
| 2005/0253425 A1 | 11/2005 | Asada et al. | |
| 2007/0145808 A1 | 6/2007 | Minuth et al. | |
| 2010/0244504 A1 * | 9/2010 | Colja | A61H 9/0078 297/284.6 |
| 2016/0375809 A1 * | 12/2016 | Nguyen | B60N 2/882 297/396 |
| 2017/0368969 A1 * | 12/2017 | Shibata | B60N 2/914 |
| 2018/0072199 A1 * | 3/2018 | Strumolo | B60N 2/806 |
| 2018/0079335 A1 * | 3/2018 | Jaranson | B60N 2/914 |
| 2018/0178694 A1 * | 6/2018 | McMillen | B60N 2/7017 |
| 2018/0229632 A1 * | 8/2018 | Line | B60N 2/5621 |

(Continued)

FOREIGN PATENT DOCUMENTS

| | | | | |
|---|---|---|---|---|
| CN | 104842838 A | * | 8/2015 | ........... B60N 2/4415 |
| CN | 112896002 A | * | 6/2021 | ............. B60N 2/665 |

(Continued)

*Primary Examiner* — Timothy J Brindley
(74) *Attorney, Agent, or Firm* — MacMillan, Sobanski & Todd, LLC

(57) ABSTRACT

A method of controlling a seat cooling cycle in a vehicle seat includes determining whether a vehicle cooling system is operating. If the vehicle cooling system is operating, then executing a seat cooling cycle such that portions of an occupant-facing surface of the vehicle seat are urged outwardly to create high contact zones between the occupant and the portions of the vehicle seat that have been urged outwardly, and such that areas of reduced occupant contact are defined between adjacent ones of the portions of the occupant-facing surface that are urged outwardly, wherein the areas of reduced occupant contact define low pressure zones that facilitate the flow of air between the vehicle seat and the occupant within the low pressure zones.

14 Claims, 8 Drawing Sheets

(56) References Cited

U.S. PATENT DOCUMENTS

| | | | |
|---|---|---|---|
| 2018/0238355 A1* | 8/2018 | Zabielski | B60N 2/665 |
| 2019/0038229 A1* | 2/2019 | Perraut | A61H 9/0078 |
| 2019/0106030 A1* | 4/2019 | Kim | B60N 2/914 |
| 2020/0238869 A1* | 7/2020 | Line | B60N 2/6673 |
| 2020/0245770 A1* | 8/2020 | Munechika | B60N 2/914 |

FOREIGN PATENT DOCUMENTS

| | | | | |
|---|---|---|---|---|
| CN | 112918346 A | * | 6/2021 | A61F 7/00 |
| KR | 102070024 B1 | * | 1/2020 | |
| KR | 20210039008 A | * | 4/2021 | |

* cited by examiner

VENTILATED SEAT WITH LOW PRESSURE ZONE INDUCED AIRFLOW

BACKGROUND OF THE INVENTION

This invention relates in general to a ventilated seat. More specifically, this invention relates to a ventilated seat with low pressure induced air flow.

Some conventional vehicle seats include climate control features for the comfort of an occupant. A typical ventilated vehicle seat includes a fan or a blower to move air past the occupant. The moving air can increase evaporation and help cool the occupant. An active heating/cooling system that uses heating elements or cooling elements may be included in order to provide conditioned air to further increase the comfort of the occupant.

The fan on the ventilated seat may operate as a push device or as a pull device. When the fan pushes air, it functions as a blower, it draws in air from the environment, usually from below or behind the ventilated seat. The blower then pushes the air through an air channel through the ventilated seat to an A-surface of the seat where the occupant is seated. The air is moved out through the A-surface and past the occupant. When the fan pulls air, it draws air in through the A-surface past the occupant. The air is then pulled through the air channel and expelled out into the environment, usually below or behind the ventilated seat. A typical active cooling system also uses the blower.

The ventilated seat typically includes an air distribution system on the A-surface. The air distribution system allows the air to be moved across an area on the A-surface. However, the flow of air may be restricted by the occupant when, for example, the occupant's back continuously contacts the seat back while seated in the vehicle. The conventional vehicle seat may also include selectively inflatable air bladders configured to provide support, or as part of a massage system. These air bladders may be provided on one or both of the A-surface and the B-surface of the cushion foam of the seat. It would be desirable therefore, to have an improved ventilated vehicle seat that provides increased airflow to the occupant for improved heating and cooling.

SUMMARY OF THE INVENTION

This invention relates to an improved ventilated vehicle seat and method that provides increased airflow to the occupant for improved heating and cooling through the application of low pressure induced air flow.

A method of controlling a seat cooling cycle in a vehicle seat includes determining whether a vehicle cooling system is operating. If the vehicle cooling system is operating, then executing a seat cooling cycle such that portions of an occupant-facing surface of the vehicle seat are urged outwardly to create high contact zones between the occupant and the portions of the vehicle seat that have been urged outwardly, and such that areas of reduced occupant contact are defined between adjacent ones of the portions of the occupant-facing surface that are urged outwardly, wherein the areas of reduced occupant contact define low pressure zones that facilitate the flow of air between the vehicle seat and the occupant within the low pressure zones.

Various aspects of this invention will become apparent to those skilled in the art from the following detailed description of the preferred embodiment, when read in light of the accompanying drawings.

DETAILED DESCRIPTION OF THE PREFERRED EMBODIMENT

Figure 1:
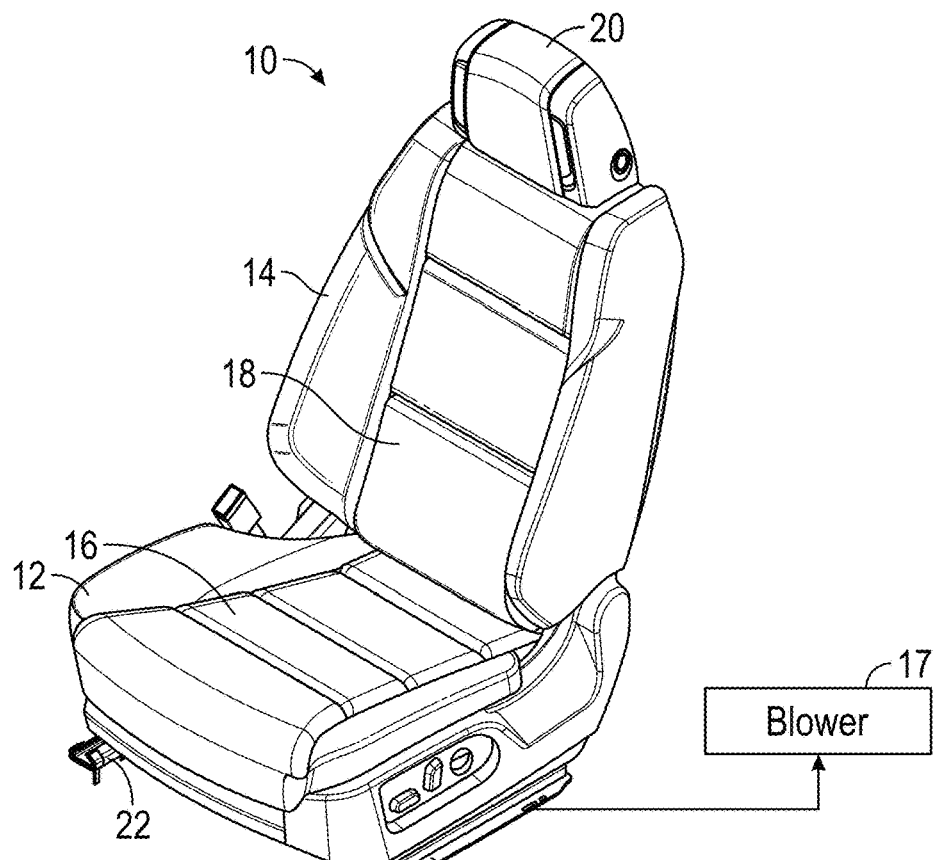
FIG. 1 is a perspective view of an improved ventilated vehicle seat in accordance with this invention.

Referring now to the drawings, there is illustrated in FIG. 1 a perspective view of a ventilated vehicle seat equipped with air bladders, indicated generally at 10. The illustrated ventilated seat 10 is a vehicle seat that is adapted for use in a vehicle, such as a passenger car. However, the ventilated seat 10 may be any desired type of seat.

The ventilated seat 10 includes a seat cushion 12 and a seat back 14. The seat cushion 12 includes a cushion trim 16, and the seat back 14 includes a back trim 18. The illustrated cushion trim 16 and back trim 18 are made of cloth fabric and/or perforated leather, but the cushion trim 16 and the back trim 18 may be made of any desired permeable material. As best shown in FIGS. 6 through 10, foundation material or backing 19 is secured to an underside of the back trim 18. The backing 19 may be made from a polymer foam material, but may also be made from any desired material by any desired process as long as it meets requirements for permeability. For example, the backing 19 may be made from polyethylene, polyester, polypropylene, polyurethane, polystyrene foam, or other desired spacer fabric. The ventilated seat 10 further includes a blower 17. The ventilated seat 10 may include a headrest 20 and brackets 22 for attaching the ventilated seat 10 to an automobile body (not shown).

Referring again to FIGS. 6 through 10, the seat back 14 further includes cushion foam 42. The illustrated cushion foam 42 is a molded closed-cell foam, but may be made of any desired material and by any desired process. The cushion foam 42 provides comfort and support for an occupant 44 of the ventilated seat 10. The cushion foam 42 includes a cushion A-side 42A, which is the side of the cushion foam 42 that normally faces the occupant 44, and an opposed cushion B-side 42B. The cushion foam 42 is supported by a seat back frame 24, as is known in the art.

Figure 3:
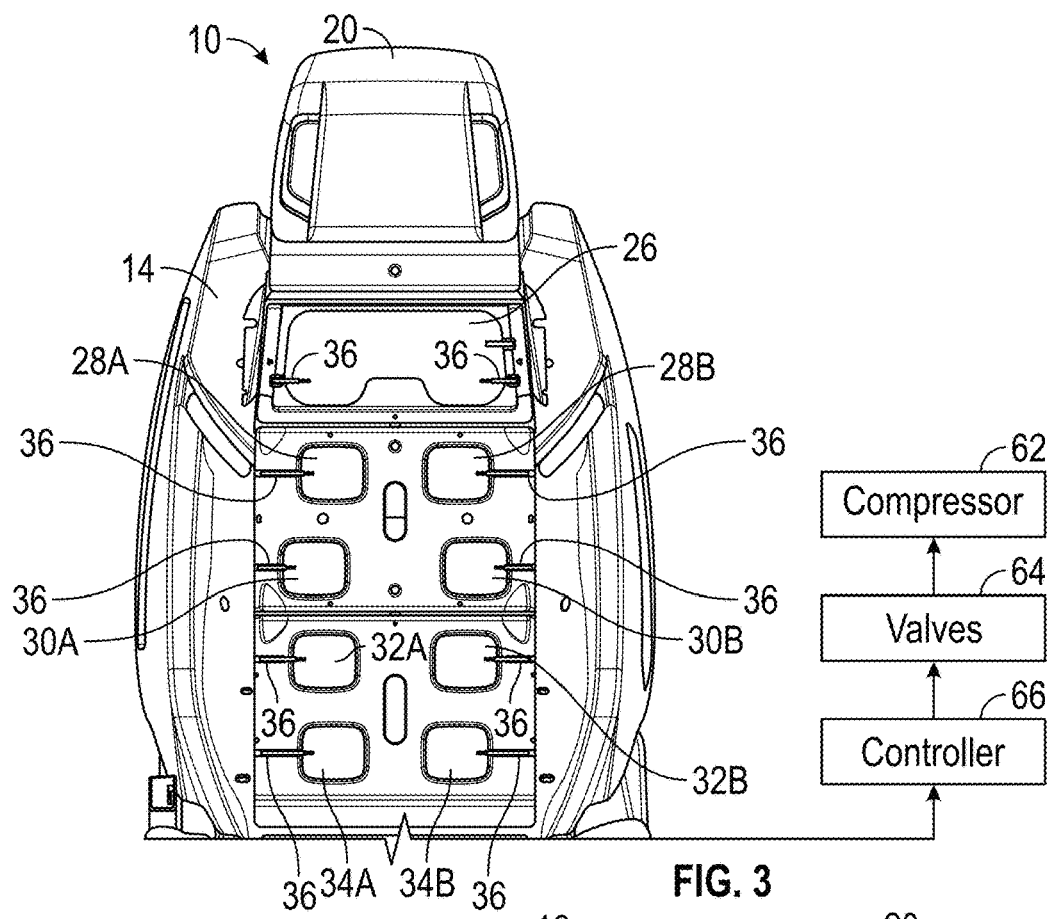
FIG. 3 is an alternate view of the seat back shown in FIG. 2 showing the seat cover material removed.

Referring to FIG. 3, the seat back 14 is shown with its back trim 18 and underlying backing 19 removed to expose a first portion of the seat back frame 24 and a plurality of A-side air bladders positioned on the A-side of the cushion foam 42. As shown in FIG. 3, the seat back 14 includes a single upper A-side air bladder 26 mounted on an upper portion of the cushion foam 42. Additionally, four pairs of A-side air bladders are mounted to the A-side of the cushion foam 42 between the air bladder 26 and a lower portion of the seat back 14. The pairs of A-side air bladders include a first pair of air bladders 28A and 28B, a second pair of air bladders 30A and 30B, a third pair of air bladders 32A and 32B, and a fourth pair of air bladders 34A and 34B. The air bladders 26, 28A, 28B, 30A, 30B, 32A, 32B, 34A, and 34B are inflatable and deflatable.

As best shown in FIG. 3, the ventilated seat 10 further includes an air compressor 62, a plurality of valves 64, and a controller 66. The air compressor 62 provides a source of air for inflating the air bladders 26, 28A, 28B, 30A, 30B, 32A, 32B, 34A, and 34B. The valves 64 are configured to receive compressed air from the air compressor 62, and are in fluid communication with the air bladders 26, 28A, 28B, 30A, 30B, 32A, 32B, 34A, and 34B via air flow tubes 36. The air flow tubes 36 may be configured as flexible tubes, hoses, and the like. The air compressor 62 may be any conventional air compressor or other pneumatic device configured to provide a source of air for inflating the A-side air bladders 26, 28A, 28B, 30A, 30B, 32A, 32B, 34A, and 34B. The controller 66 controls the valves 64 to regulate air flow into and out of the air bladders 26, 28A, 28B, 30A, 30B, 32A, 32B, 34A, and 34B. As will be described further below, the air bladders are thus each adjustable and may be individually inflated and deflated, or inflated and deflated in any combination of more than one air bladder.

Figure 4:
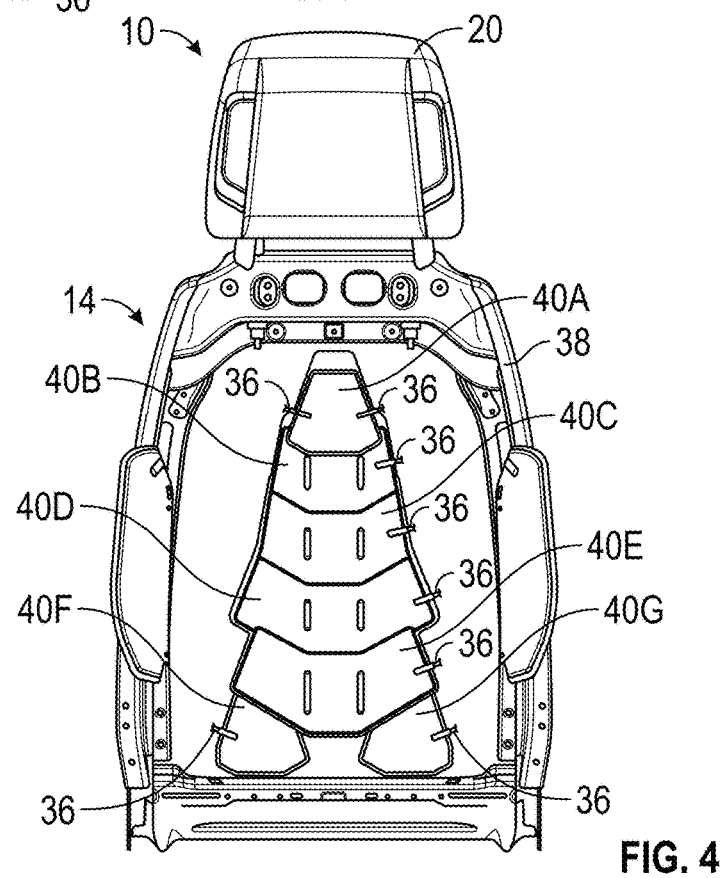
FIG. 4 is a front view of a portion of the seat back illustrated in FIGS. 2 and 3 showing the seat frame and the B-side air bladders.

Referring to FIG. 4, the seat back 14 is again shown with its seat back trim 18, underlying backing 19, and cushion foam 42 removed to expose a second portion of a seat back frame 38 and a set of B-side air bladders 40A—40G positioned on the B-side of the cushion foam 42. Like the A-side air bladders, the B-side air bladders 40A—40G are inflatable and deflatable, and air flow tubes 36, of which only a portion of each are shown, fluidly connect each of the B-side air bladders to the valves 64 and the air compressor 62.

The A-side air bladders and the B-side air bladders may be conventional air bladders that are configured to provide support to the vehicle occupant, or as part of a massage system. It will be understood that the seat back 14 may have other combinations of A-side air bladders and B-side air bladders. For example, in the embodiment of the seat back 14 shown in FIG. 6, the A-side air bladder 26 is not provided.

Figure 5:
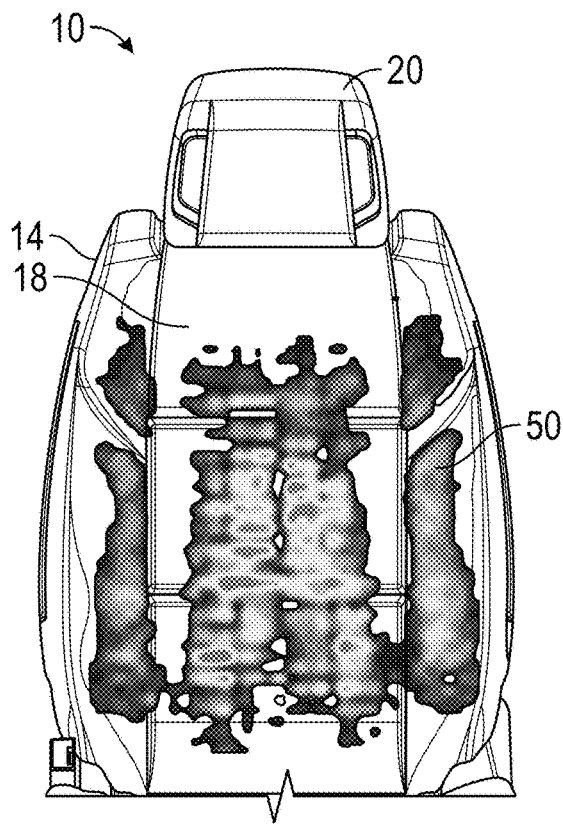
FIG. 5 is an alternate view of the seat back shown in FIG. 2, showing a first body pressure diagram thereon.

FIG. 5 is a front view of the seat back 14 shown in FIG. 1 and shows a first body pressure diagram 50 thereon. In FIG. 5, the A-side air bladders and the B-side air bladders are deflated. Thus, the first body pressure diagram 50 is representative of the pressure applied to the occupant-facing surface of the seat back 14 by the occupant 44 when neither the A-side air bladders nor the B-side air bladders are inflated.

Figure 2:
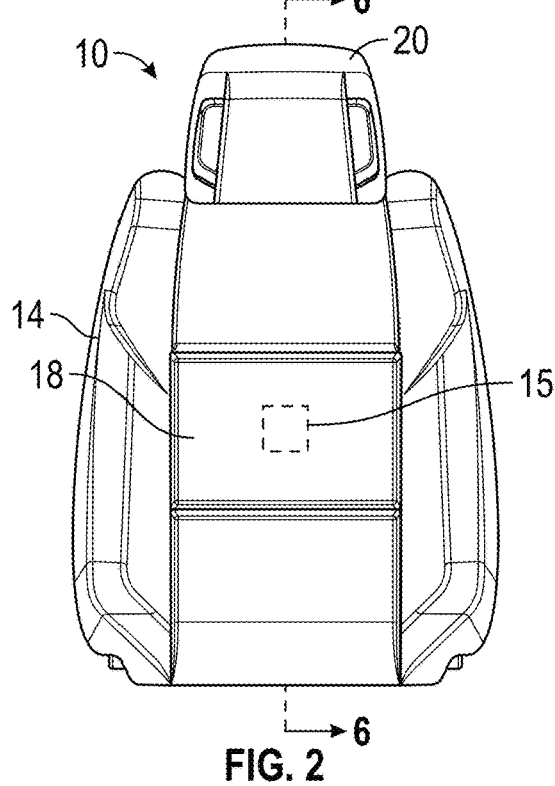
FIG. 2 is a front view of the seat back shown in FIG. 1.
Figure 6:
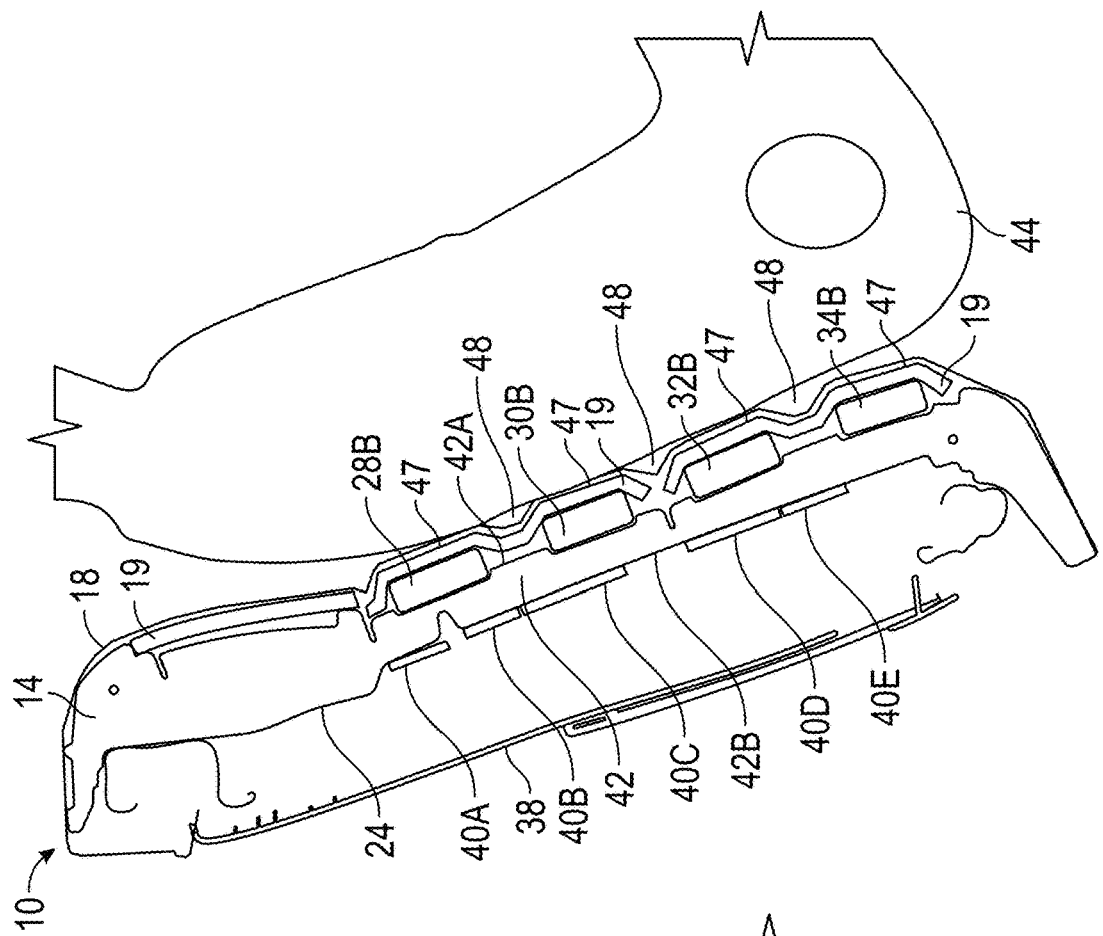
FIG. 6 is a cross-sectional view taken along the line 6-6 of FIG. 2 and showing the A-side air bladders and the B-side air bladders deflated, and an occupant seated on the vehicle seat and a resting against the seat back.

FIG. 6 is a cross-sectional view of the seat back 14 illustrated in FIG. 2 and shows portions of the seat back frame 24 and 38, the A-side air bladders 28B, 30B, 32B, 34B, and the B-side air bladders 40A-40E, the cushion foam 42, the seat back trim 18, and the backing 19. A vehicle occupant 44 is seated on the vehicle seat 10 and is resting against the seat back 14. In FIG. 6, as in FIG. 5, the A-side air bladders and the B-side air bladders are shown deflated. A region of full contact 46 is defined between the occupant 44 and the seat back 14 where the occupant's back rests against the seat back 14. This region of full contact 46 defines a region wherein the occupant's 44 body negatively restricts airflow in the seat back 14 of the ventilated seat 10, and thus limits the ability of the ventilated seat 10 to fully cool the occupant 44.

Figure 7:
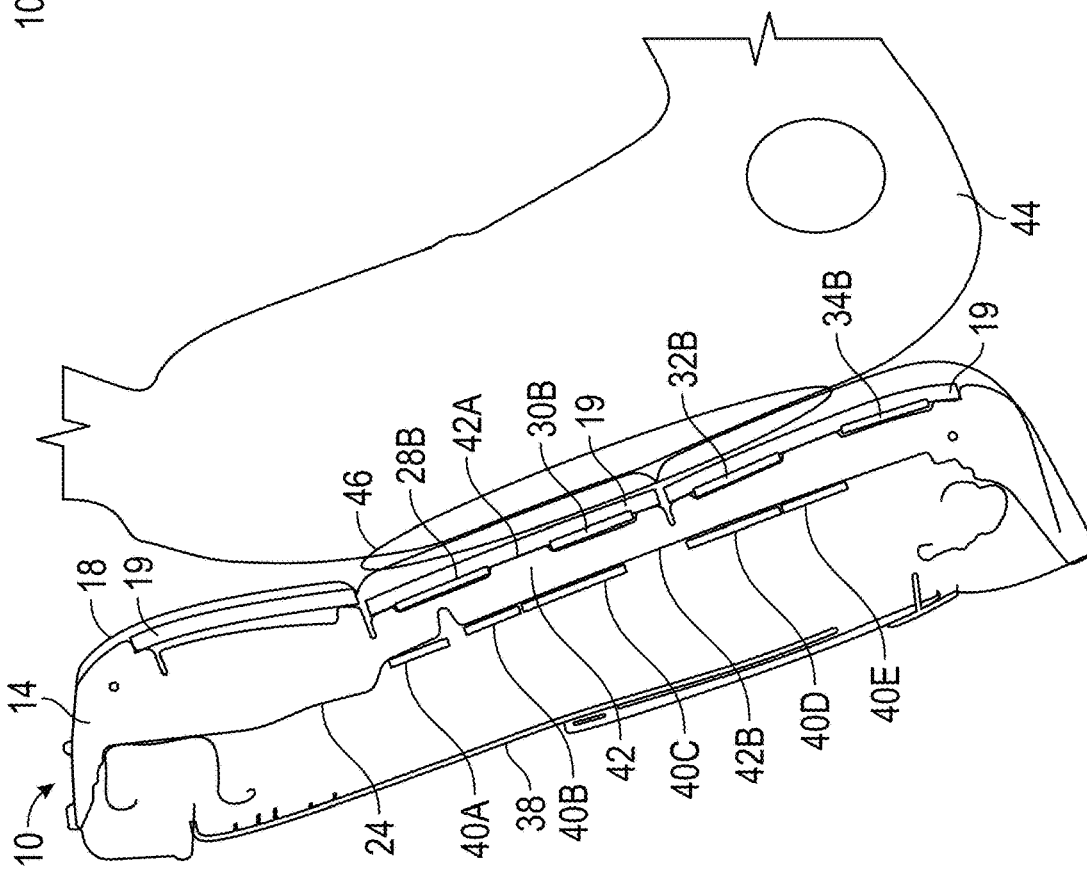
FIG. 7 is an alternate view of FIG. 6 showing the A-side air bladders inflated, the B-side air bladders deflated, an occupant seated on the vehicle and a resting against the seat back, and the airflow channels formed on the surface of the seatback.

FIG. 7 is similar to FIG. 6 and shows the occupant 44 seated on the vehicle seat 10 and a resting against the seat back 14. However, in FIG. 7 the A-side air bladders 28B, 30B, 32B, and 34B, are inflated and the B-side air bladders 40A-40E are shown deflated. As shown at 48 the inflated A-side air bladders 28B, 30B, 32B, and 34B urge the occupant-facing surface of the seat back 14 outwardly, create high contact zones 47 between the occupant 44 and the portions of the seat back 14 urged outwardly by the A-side air bladders 28B, 30B, 32B, and 34B, and create areas of reduced occupant contact between adjacent A-side air bladders. These areas of reduced occupant contact define low pressure zones 48 that facilitate the flow of air between the seat back 14 and the occupant 44 within the low pressure zones 48.

Figure 8:
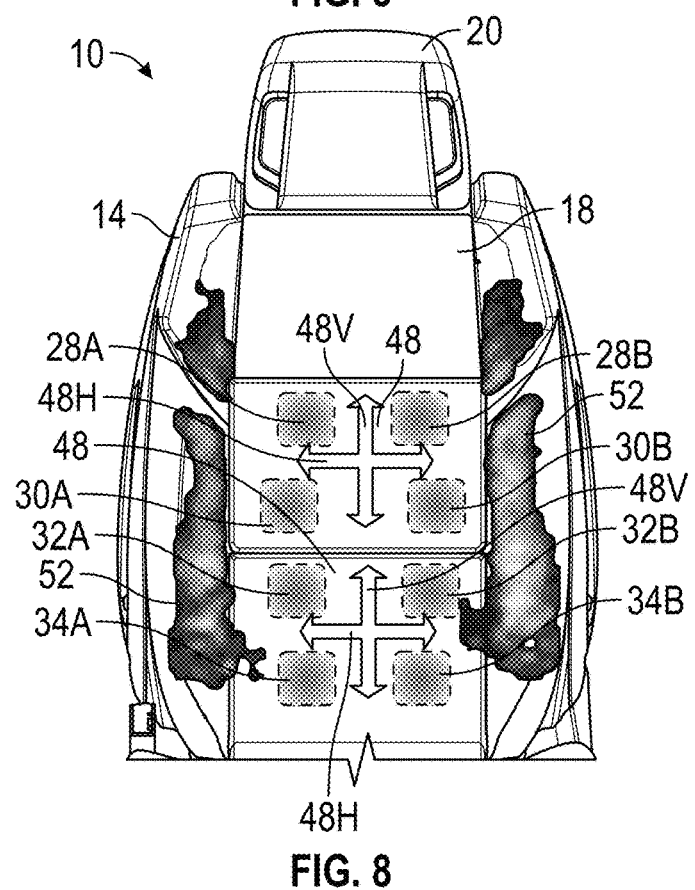
FIG. 8 is an alternate view of the seat back shown in FIG. 2, showing inflated A-side air bladders and a second body pressure diagram thereon.

The low pressure zones 48 are further illustrated in FIG. 8. FIG. 8 is similar to FIG. 5, is a front view of the seat back 14 shown in FIG. 1, and shows a second body pressure diagram 52 thereon. In FIG. 8, each of the A-side air bladders 28A, 28B, 30A, 30B, 32A, 32B, 34A, and 34B are inflated and the B-side air bladders are deflated. Thus, the second body pressure diagram 52 is representative of the pressure applied to the occupant-facing surface of the seat back 14 by the occupant 44 when each of the A-side air bladders 28A, 28B, 30A, 30B, 32A, 32B, 34A, and 34B urge portions of the occupant-facing surface of the seat back 14 outwardly, and create the high contact zones 47 and the low pressure zones 48 shown in FIG. 7. As shown in FIG. 8 the low pressure zones 48 extend both vertically (see the arrows 48V) and horizontally (see the arrows 48H) between adjacent A-side air bladders. The low pressure zones 48 facilitate the flow of air between the seat back 14 and the occupant 44 within the low pressure zones 48 along airflow paths defined by the arrows 48V and 48H. It will be understood that a low pressure zone 48 is also defined between the second pair of air bladders 30A and 30B and the third pair of air bladders 32A and 32B when both pairs are inflated, further facilitating the flow of air between the seat back 14 and the occupant 44 within the low pressure zone 48 therebetween.

Figure 10:
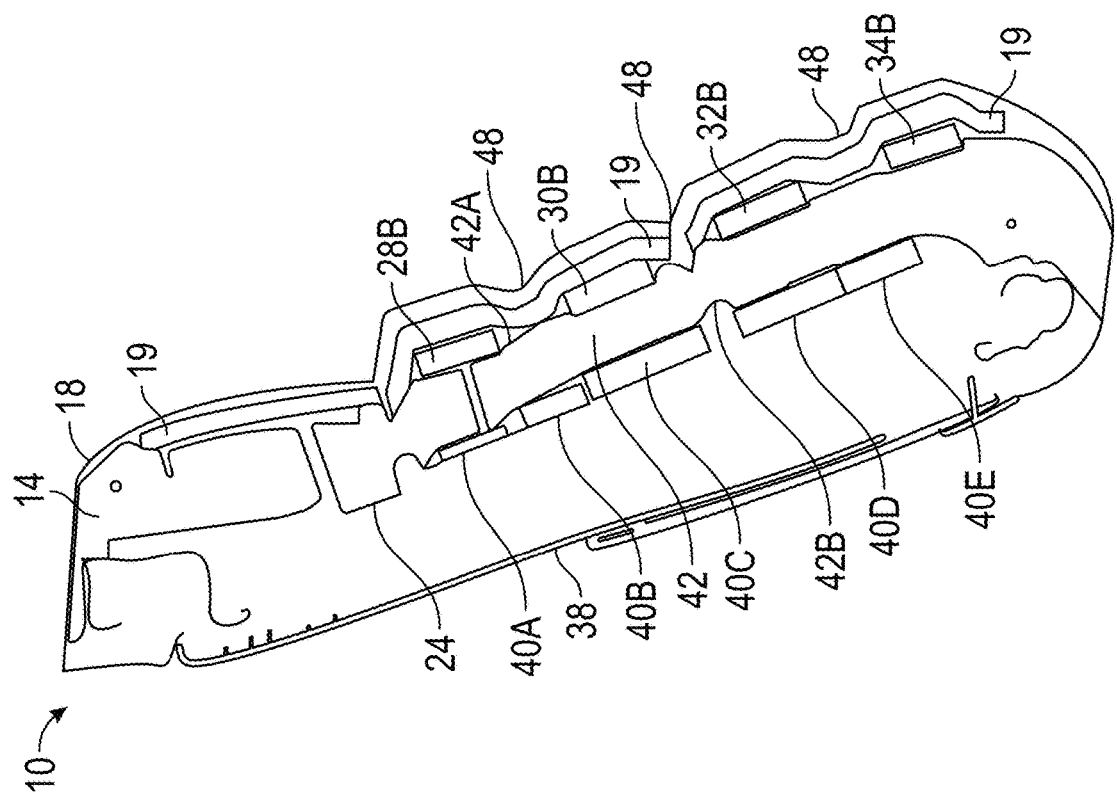
FIG. 10 is an is an alternate view of FIG. 6 showing both the A-side air bladders and the B-side air bladders inflated.
Figure 9:
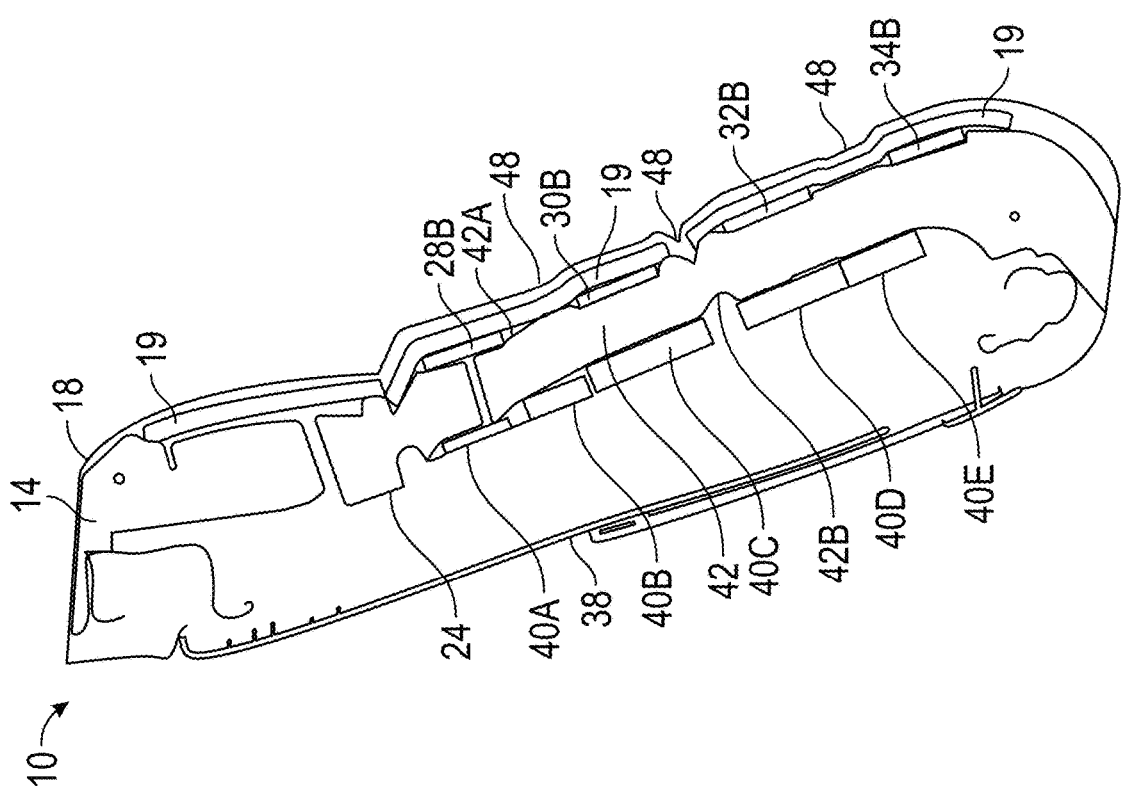
FIG. 9 is an is an alternate view of FIG. 6 showing the A-side air bladders deflated and the B-side air bladders inflated.

In addition to the air bladder inflation configurations illustrated in FIGS. 6 and 7, the B-side air bladders 40A-40E may be inflated while the A-side air bladders 28A, 28B, 30A, 30B, 32A, 32B, 34A, and 34B remain deflated, as shown in FIG. 9. Additionally, both the B-side air bladders 40A-40E and the A-side air bladders 28A, 28B, 30A, 30B, 32A, 32B, 34A, and 34B may be inflated, as shown in FIG. 10.

Advantageously, each pair of A-side bladders may be independently and sequentially inflated such that the location of the airflow paths 48V and 48H defined by the low pressure zones 48 can be moved up and down relative to the back of the occupant 44.

Figure 11B:
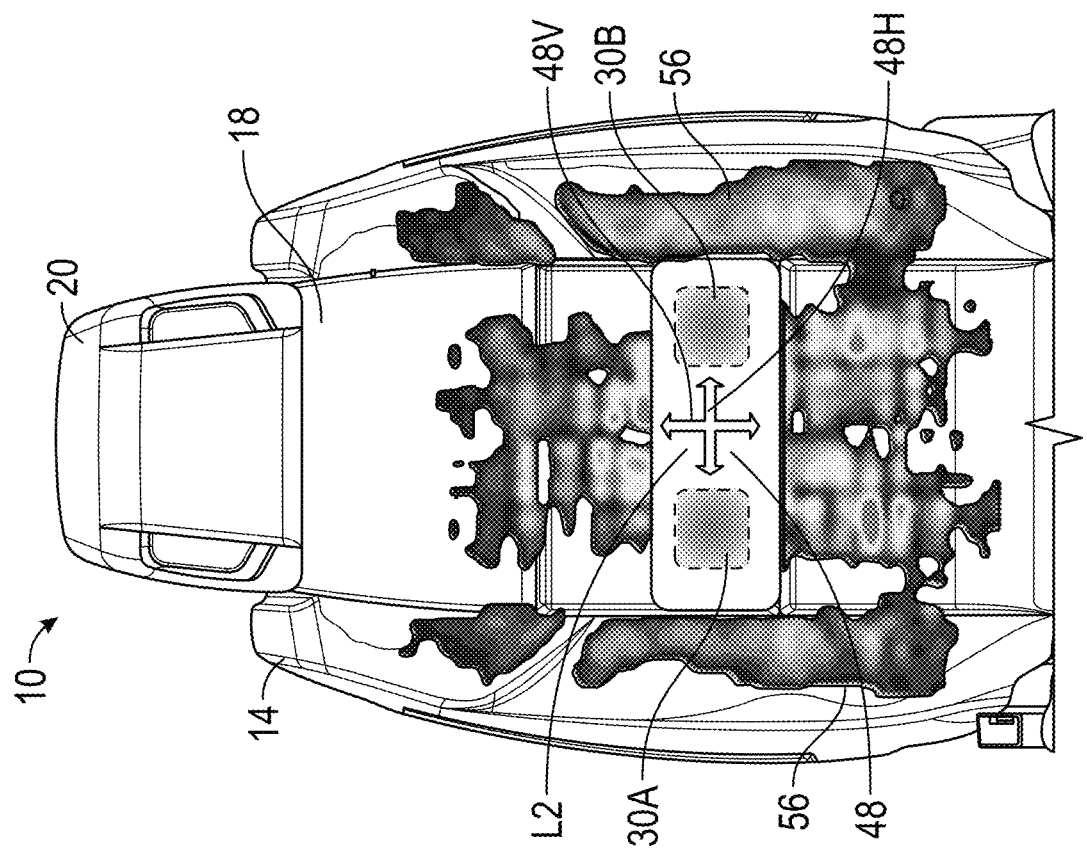
FIG. 11B is a front view of the seat back shown in FIG. 1 showing a second pair of A-side air bladders inflated and the resulting body pressure diagram thereon.
Figure 11A:
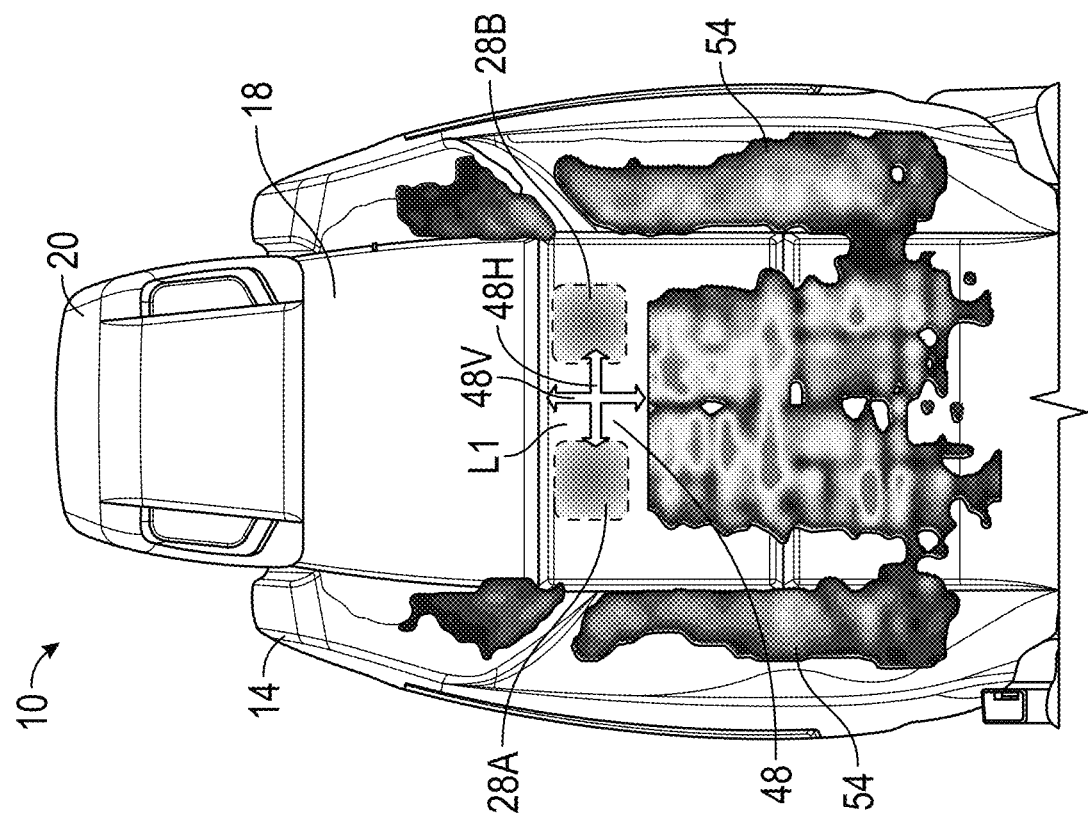
FIG. 11A is a front view of the seat back shown in FIG. 1 showing a first pair of A-side air bladders inflated and the resulting body pressure diagram thereon.

For example, as shown in FIG. 11A, the first pair of A-side bladders 28A and 28B may be inflated, thus creating the airflow paths 48V and 48H in a first location L1 when the A-side bladders 28A and 28B are inflated. The third body pressure diagram 54, shown in FIG. 11A is thus representative of the pressure applied to the occupant-facing surface of the seat back 14 by the occupant 44 when only the A-side air bladders 28A and 28B are inflated.

As shown in FIG. 11B, the second pair of A-side bladders 30A and 30B may be inflated, thus creating the airflow paths 48V and 48H in a second location L2 when the A-side bladders 30A and 30B are inflated. The fourth body pressure diagram 56, shown in FIG. 11B is thus representative of the pressure applied to the occupant-facing surface of the seat back 14 by the occupant 44 when only the A-side air bladders 30A and 30B are inflated.

Figure 11C:
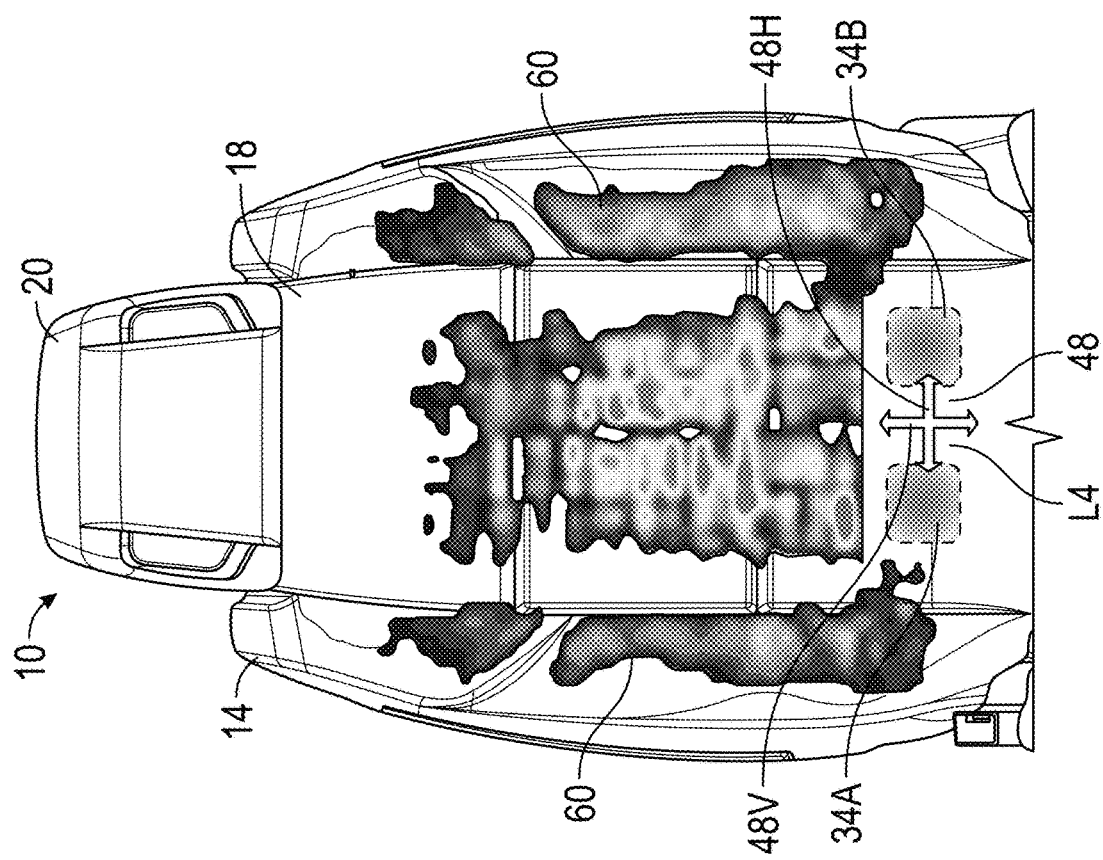
FIG. 11C is a front view of the seat back shown in FIG. 1 showing a third pair of A-side air bladders inflated and the resulting body pressure diagram thereon.

As shown in FIG. 11C, the third pair of A-side bladders 32A and 32B may be inflated, thus creating the airflow paths 48V and 48H in a third location L3 when the A-side bladders 32A and 32B are inflated. The fifth body pressure diagram 58, shown in FIG. 11C is thus representative of the pressure applied to the occupant-facing surface of the seat back 14 by the occupant 44 when only the A-side air bladders 32A and 32B are inflated.

Figure 11D:
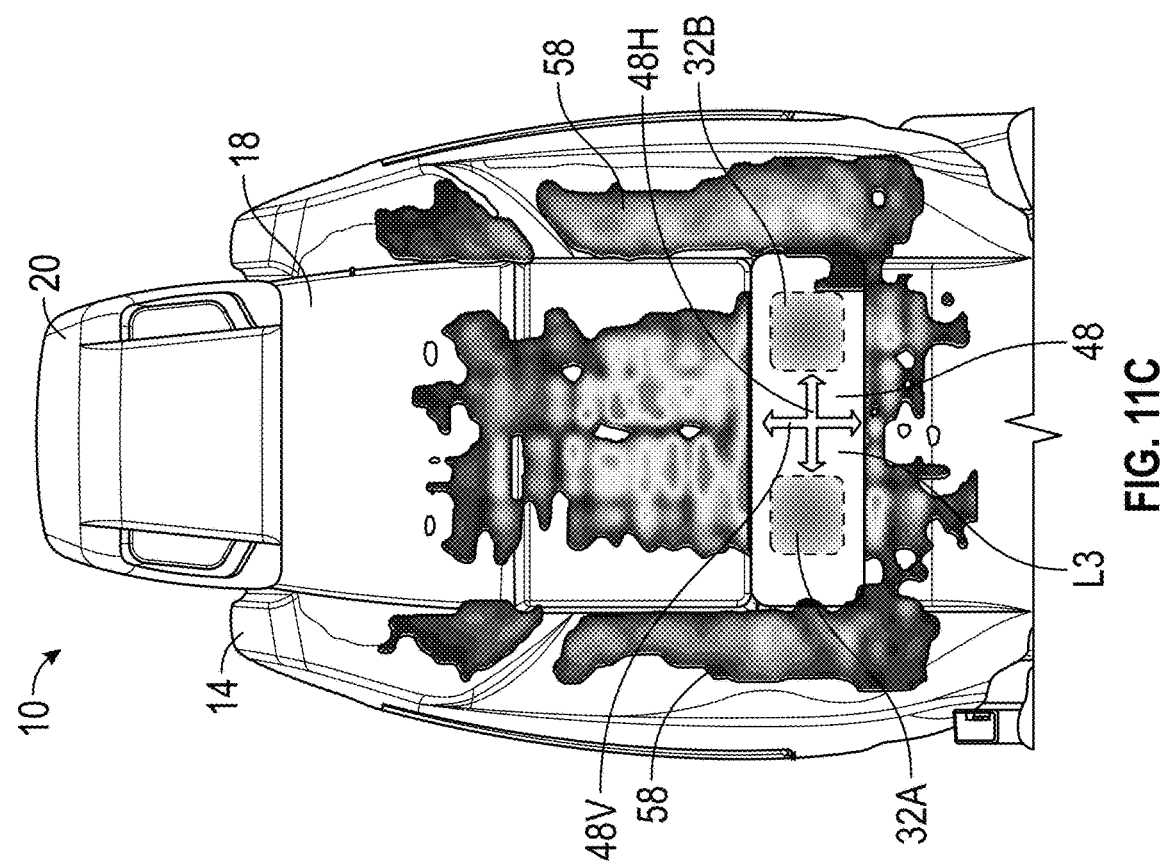
FIG. 11D is a front view of the seat back shown in FIG. 1 showing a fourth pair of A-side air bladders inflated and the resulting body pressure diagram thereon.
Figure 12:
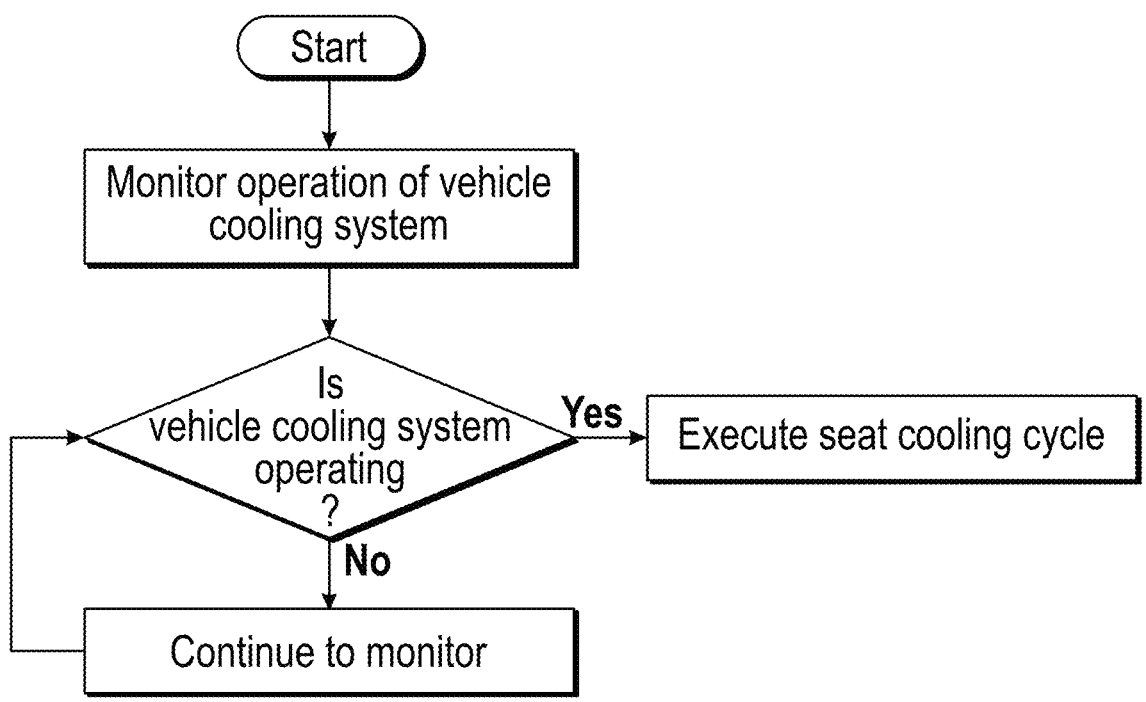
FIG. 12 is a flow chart showing an exemplary method of controlling a cooling cycle according to the method of this invention.

As shown in FIG. 11D, the fourth pair of A-side bladders 34A and 34B may be inflated, thus creating the airflow paths 48V and 48H in a fourth location L4 when the A-side bladders 34A and 34B are inflated. The sixth body pressure diagram 60, shown in FIG. 11D is thus representative of the pressure applied to the occupant-facing surface of the seat back 14 by the occupant 44 when only the A-side air bladders 34A and 34B are inflated.

To mitigate the limited ability of the ventilated seat 10 to fully cool the occupant 44 in the region of full contact 46 between the occupant 44 and the seat back 14 caused by the restricted airflow in the seat back 14, the A-side air bladders 26, 28A, 28B, 30A, 30B, 32A, 32B, 34A, and 34B, may be actuated, individually, in pairs, collectively, or in any other combination, to create the low pressure zones 48 that facilitate the flow of air between the seat back 14 and the occupant 44 within the low pressure zones 48.

Advantageously, the A-side air bladders 26, 28A, 28B, 30A, 30B, 32A, 32B, 34A, and 34B may be actuated sequentially to define a seat cooling cycle. For example, one or more seat cooling cycles may be implemented and controlled by an algorithm in the controller 66.

In a first embodiment of a method of controlling a seat cooling cycle, the first pair of air bladders 28A and 28B may be inflated for any desired period of time, then deflated upon inflation for the desired period of time of the second pair of air bladders 30A and 30B. Likewise, the second pair of air bladders 30A and 30B will be deflated upon inflation of the third pair of air bladders 32A and 32B for the desired period of time. The fourth pair of air bladders 34A and 34B will then be inflated for the desired period of time upon deflation of the third pair of air bladders 32A and 32B, then deflated, wherein the seat cooling cycle may begin again immediately, or may begin again after a predetermined period of time.

The period of time that each pair of air bladders is inflated during the seat cooling cycle may be any desired time, such as within about 5 seconds to about 20 seconds. It will be understood that the period of time that each pair of air bladders is inflated during the seat cooling cycle seat cooling cycle need not be uniform and that each pair may remain inflated for different periods of time.

In each case, the inflation of a pair of A-side air bladders creates one of the low pressure zones 48 that facilitate the flow of air between the seat back 14 and the occupant 44 within the low pressure zones 48 between the air bladders of the pair of A-side air bladders, such as between the A-side air bladders 28A and 28B as shown in FIG. 11A. Thus, sequential inflation of the pairs of A-side air bladders 28A and 28B, 30A and 30B, 32A and 32B, and 34A and 34B, creates sequentially actuated low pressure zones 48 that move relative to a back of the occupant 44, such as, for example, from an upper portion of the seat back 14 to a lower portion of the seat back 14. Advantageously, the algorithm in the controller 66 may control the actuation of low pressure zones 48 in any desired sequence, such as from the lower portion of the seat back 14 to the upper portion of the seat back 14, or in any other desired sequence.

In a second embodiment of a method of controlling a seat cooling cycle, multiple pairs of the A-side air bladders may be inflated for any desired period of time. For example, the first pair of air bladders 28A and 28B and the second pair of air bladders 30A and 30B may be simultaneously inflated for any desired period of time, then deflated upon inflation for the desired period of time of the combination of second pair of air bladders 30A and 30B and the third pair of air bladders 32A and 32B for the desired period of time. Alternatively, the inflation of the first and second pairs of A-side air bladders, 28A and 28B, and 30A and 30B, respectively, may be followed by the inflation for the desired period of time of the combination of the third pair of air bladders 32A and 32B and the fourth pair of air bladders 34A and 34B for the desired period of time.

In second embodiment of a method of controlling a seat cooling cycle, the inflation of multiple pairs of A-side air bladders, creates multiple ones of the low pressure zone 48 that facilitate the flow of air between the seat back 14 and the occupant 44 within the low pressure zones 48, including between the air bladders of the pair of A-side air bladders, such as between the A-side air bladders 28A and 28B as shown in FIG. 11A, and between the pairs of A-side bladders, such as shown in FIG. 8. Thus, sequential inflation of any combination of multiple pairs of the A-side air bladders 28A and 28B, 30A and 30B, 32A and 32B, and 34A and 34B, creates sequentially actuated low pressure zones 48 that moves relative to a back of the occupant 44, such as, for example, from an upper portion of the seat back 14 to a lower portion of the seat back 14. Advantageously, the algorithm in the controller 66 may control the actuation of low pressure zones 48 in any desired sequence, such as from the lower portion of the seat back 14 to the upper portion of the seat back 14, or in any other desired sequence.

It will be understood that the seat cooling cycle may include the inflation and subsequent deflation of any number of individual A-side air bladders, pairs of A-side air bladders, or groups of A-side air bladders.

Additionally, the seat cooling cycle may be actuated based on a temperature sensed in the seat back 14 by a temperature sensor 15 disposed in the seat back, such as shown in FIG. 2. The seat cooling cycle may also be actuated by the vehicle occupant using any conventional means of actuation.

Similarly, the B-side air bladders 40A-40G may be individually, collectively, and/or sequentially inflated and deflated to create one or more low pressure zones 48, as best shown in FIG. 9. Adjacent ones of the B-side air bladders may be inflated to define the low pressure zone 48 and the associated air flow paths 48H and 48V between the inflated adjacent B-sided air bladders. For example, the B-side air bladders 40A and 40B may be inflated for the desired period of time, then the B-side air bladders 40B and 40C may be inflated for the desired period of time.

Additionally, both the A-side air bladders 26, 28A, 28B, 30A, 30B, 32A, 32B, 34A, and 34B, and the B-side air bladders 40A-40G may be actuated, individually, in pairs, collectively, or in any other combination, to also create the low pressure zones 48 that facilitate the flow of air between the seat back 14 and the occupant 44 within the low pressure zones 48, as best shown in FIG. 10.

The embodiments of the method of controlling a seat cooling cycle in a vehicle seat described herein have been in the context of the seat back 14. However, it will be understood that the method of controlling a seat cooling cycle in a vehicle seat described herein may also be applied to the seat cushion 12.

The principle and mode of operation of this invention have been explained and illustrated in its preferred embodiment. However, it must be understood that this invention may be practiced otherwise than as specifically explained and illustrated without departing from its spirit or scope.

What is claimed is:

1. A method of controlling a combined air distribution and massage system in a seat comprising the steps of:
    providing a seat having a combined air distribution and massage system that includes a fan, an air distribution portion having an air channel that is in fluid communication with the fan and is adapted to move air to and/or from the fan and past an occupant of the seat, and a massage portion having an air bladder that is in fluid communication with the fan and is adapted to inflate and/or deflate to provide support for the occupant of the seat; and
    if the air distribution portion of the combined air distribution and massage system is operating, then operating the massage portion of the combined air distribution and massage system such that:
        first portions of the seat are urged outwardly from the seat to define high contact zones between the occupant and the first portions of the seat, and
        second portions of the seat are not urged outwardly from the seat to define low pressure zones between the occupant and the second portions of the seat that facilitate the flow of air through the air distribution portion of the combined air distribution and massage system when the occupant is on the seat.

2. The method according to claim 1, wherein the seat includes a seat back having cushion foam therein and a plurality of A-side air bladders positioned on an A-side of the cushion foam;
    wherein when inflated, the plurality of A-side air bladders urge the portions of the occupant-facing surface of the seat outwardly to create the high contact zones and the low pressure zones therebetween; and
    wherein the seat cooling cycle includes sequentially actuating ones of the plurality of A-side air bladders to define a seat cooling cycle.

3. The method according to claim 2, wherein the seat is a ventilated vehicle seat having an air compressor connected to the plurality of A-side air bladders via a plurality of valves, and a controller; and
    wherein the seat cooling cycle is implemented and controlled by an algorithm in the controller.

4. The method according to claim 2, wherein the plurality of A-side air bladders are configured as a plurality of pairs of air bladders that are selectively inflatable and deflatable; and
    wherein when a pair of the air bladders are inflated, the low pressure zone and the associated path for the flow of air is defined between the air bladders of the pair of air bladders.

5. The method according to claim 4, wherein the seat cooling cycle includes sequentially actuating ones of the plurality of pairs of the A-side air bladders to define the seat cooling cycle.

6. The method according to claim 5, wherein the seat is a ventilated vehicle seat having an air compressor connected to the plurality of A-side air bladders via a plurality of valves, and a controller; and
    wherein the seat cooling cycle is implemented and controlled by an algorithm in the controller.

7. The method according to claim 4, wherein the seat cooling cycle includes sequentially actuating multiple ones of the plurality of pairs of the A-side air bladders to define the seat cooling cycle.

8. The method according to claim 7, wherein the seat is a ventilated vehicle seat having an air compressor connected to the plurality of A-side air bladders via a plurality of valves, and a controller; and
    wherein the seat cooling cycle is implemented and controlled by an algorithm in the controller.

9. The method according to claim 2, wherein the seat back further includes a plurality of B-side air bladders positioned on a B-side of the cushion foam;
    wherein when inflated, the plurality of B-side air bladders urge the portions of the occupant-facing surface of the seat outwardly to create the high contact zones and the low pressure zones therebetween; and
    wherein the seat cooling cycle includes sequentially actuating ones of the plurality of B-side air bladders to define a seat cooling cycle.

10. The method according to claim 9, wherein the seat cooling cycle includes sequentially actuating ones of both the plurality of pairs of the A-side air bladders and the plurality of B-side air bladders to define the seat cooling cycle.

11. The method according to claim 9, wherein the seat is a ventilated vehicle seat having an air compressor connected to the plurality of B-side air bladders via a plurality of valves, and a controller; and
    wherein the seat cooling cycle is implemented and controlled by an algorithm in the controller.

12. The method according to claim 9, wherein when adjacent ones of the B-side air bladders are inflated, the low pressure zone and the associated path for the flow of air is defined between the inflated adjacent B-sided air bladders.

13. The method according to claim 12, wherein the seat cooling cycle includes sequentially actuating one or more of the B-side air bladders to define the seat cooling cycle.

14. The method according to claim 13, wherein the seat is a ventilated vehicle seat having an air compressor connected to the plurality of B-side air bladders via a plurality of valves, and a controller; and
    wherein the seat cooling cycle is implemented and controlled by an algorithm in the controller.

* * * * *